United States Patent [19]

Muir

[11] Patent Number: 4,617,135

[45] Date of Patent: Oct. 14, 1986

[54] PROCESS FOR THE PREPARATION OF OVERBASED MAGNESIUM SULFONATES

[75] Inventor: Ronald J. Muir, West Hill, Canada

[73] Assignee: Witco Corporation, New York, N.Y.

[21] Appl. No.: 745,237

[22] Filed: Jun. 17, 1985

[51] Int. Cl.⁴ .................. C10M 1/40; C10M 3/34
[52] U.S. Cl. .................................. 252/33.2; 252/33.4
[58] Field of Search .............. 252/18, 33, 33.2, 33.4, 252/33.6, 39

[56] References Cited

U.S. PATENT DOCUMENTS

| | | | |
|---|---|---|---|
| 3,055,829 | 9/1962 | Wiley et al. | 252/18 |
| 3,629,109 | 12/1971 | Gergel et al. | 252/33 |
| 3,853,774 | 12/1974 | Crocker | 252/33.4 |
| 3,865,737 | 2/1975 | Kemp | 252/33.4 |
| 4,129,589 | 12/1978 | Eliades et al. | 252/395 X |
| 4,148,740 | 4/1979 | Cease et al. | 252/33.2 |
| 4,328,111 | 5/1982 | Watson et al. | 252/33.4 |

*Primary Examiner*—Ferris H. Lander
*Attorney, Agent, or Firm*—Morton Friedman; Marvin Feldman

[57] ABSTRACT

A process for the preparation of overbased oil soluble magnesium sulfonates comprises contacting an acidic gas at a temperature between about 50° F. up to the reflux temperature of the mixture, with a mixture consisting essentially of a sulfonic acid or salt thereof, a volatile aliphatic or aromatic or chlorinated hydrocarbon solvent, a non-volatile diluent oil, a light magnesium oxide, water, methanol and combination of promoters, wherein the first promoter is one selected from an oil soluble naphthenic acid and an oil soluble carboxylic acid or salt thereof; and a second promoter being one selected from:

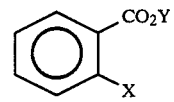

wherein X is one of H, OH, $NH_2$, $CO_2H$, $OCOCH_3$ and SH, and Y is one of H, $CH_3$ and $CH_2CH_3$, wherein the second promoter is less oil soluble than the first promoter; and (b) a water soluble $C_1$-$C_6$ carboxylic acid.

The volatile components are stripped from the reaction mixture after absorption of the acidic gas is completed, to give a highly commercially desirable overbased magnesium sulfonate. Relatively small amounts of about 1.0 to 1.5% of the combined promoters produce overbased magnesium sulfonates of exceptionally high alkalinity value up to 500 or more, with minimum sediment.

18 Claims, No Drawings

PROCESS FOR THE PREPARATION OF OVERBASED MAGNESIUM SULFONATES

FIELD OF INVENTION

This invention relates to overbased magnesium sulfonates.

BACKGROUND OF INVENTION

Overbased oil soluble magnesium salts of sulfonic acids are used as additives in oil based compositions, such as lubricants, greases, fuels and the like. They function as detergents and acid neutralizers, thereby reducing wear and corrosion and extending engine life.

Highly basic magnesium salts of a sulfonic acid having alkalinity values (AVs) and TBNs of from 400 to 500 or higher have been difficult to prepare in a one step operation using MgO as a magnesium source. Generally, prior art processes used water and methanol as promoters, and employed ammonia, ammonium salts, low molecular weight carboxylic acids, or salts thereof, oil soluble organic acids including naphthenic and carboxylic acids, or salts thereof, and amines or amine salts of an acid as secondary promoters or activators.

In U.S. Pat. No. 3,629,109, granted to Gergel et al, there is disclosed a multistage carbonation process for preparing an overbased magnesium sulfonate. By this process, mixtures of sulfonates and carboxylates are overbased to form highly basic colloidal dispersions containing substantial quantities of overbased carboxylates.

In U.S. Pat. No. 3,875,757, granted to Kemp and U.S. Pat. No. 4,148,740, granted to Cease et al, there is disclosed an overbased magnesium sulfonate process wherein ammonia or an ammonium compound is used as a promoter or activator. These processes required the costly removal of ammonium salts from the product and condensate streams. In U.S. Pat. No. 4,129,589, granted to Eliades et al, there is disclosed another overbased magnesium sulfonate process which uses low molecular weight carboxylic acids or salts thereof, such as acetic acid, as promoters. The magnesium carbonate dispersed by this process is of a crystalline variety and not the more highly desirable amorphous carbonate.

It has now been discovered that overbased magnesium sulfonates may be prepared in a highly efficient one step operation by using a combination of reaction promoters, that when present in extremely small quantities compared to prior art reaction promoters, results in a stable, haze free, high quality overbased magnesium sulfonate which is suitable for use in various types of oil based compositions.

It is therefore an object of the invention to provide a process for manufacturing oil soluble overbased magnesium salts of sulfonic acids having alkalinity values (AVs) and TBNs ranging from 400 to 500 or higher, and wherein the product is prepared in a one step operation of contacting the reaction mixture with an acidic gas.

It is further object of the invention to provide a reaction promoter system for use in processes for manufacturing oil soluble overbased magnesium sulfonates having AVs from 400 to 500 or higher.

It is another object of the invention to provide a process for preparing overbased magnesium sulfonates wherein overbasing of the sulfonic acid is accomplished by using a promoter system in combination with a light form of MgO.

SUMMARY OF THE INVENTION

This invention provides a reaction promoter system for use in the manufacture of overbased oil soluble magnesium salts of a sulfonic acid, having AVs and TBNs from 400 to 500 or higher, in a one step operation of contacting the reaction mixture with an acidic gas.

According to this invention, a process for preparing an overbased oil soluble magnesium salt of a sulfonic acid, comprises contacting an acidic gas with a mixture of a sulfonic acid or salt thereof, aliphatic or aromatic or chlorinated hydrocarbon solvent, a diluent oil, a light magnesium oxide, water, methanol and a synergistic combination of promoters, wherein the first promoter is one selected from an oil soluble naphthenic acid and an oil soluble carboxylic acid or salt thereof; and a second promoter being one selected from:

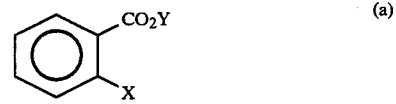

(a)

wherein X is one of H, OH, $NH_2$, $CO_2H$, $OCOCH_3$ and SH, and Y is one of H, $CH_3$, $CH_2CH_3$, wherein the second promoter is less oil soluble than the first promoter; and (b) a water soluble $C_1$–$C_6$ carboxylic acid. Relatively small amounts of about 1.0 to 1.5% of the combined promoters produce stable, haze free, high quality magnesium sulfonate dispersions of exceptionally high AV and TBN, up to 500 or more, wherein all the magnesium carbonate is dispersed as amorphous magnesium carbonate.

DESCRIPTION OF THE PREFERRED EMBODIMENTS

The aforementioned, and other objects, advantages and features of the invention will become apparent in the following detailed discussion of preferred embodiments according to this invention. It is understood that the following preferred embodiments are not to be interpeted as limiting the scope of the invention.

One principal key to this invention lies in the recognition of a specific novel combination of promoters, wherein a first promoter is an essentially oil soluble organic acid selected from the class of naphthenic acids and carboxylic acids and salts thereof; and a second promoter is one selected from:

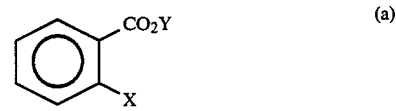

(a)

wherein X is one of H, OH, $NH_2$, $CO_2H$, $OCOCH_3$ and SH, and Y is one of H, $CH_3$, $CH_2CH_3$, wherein the second promoter is less oil soluble than the first promoter; and (b) a water soluble $C_1$–$C_6$ carboxylic acid.

It was surprisingly found that relatively small amounts of a combination of the first and second promoters produced a highly commercially desirable overbased magnesium sulfonate dispersion. By adding to the reaction mixture prior to introduction of $CO_2$, 0.5 to 1.5% by weight of the first promoter and 0.1 to 0.5% of the second promoter or a total of about 1.0 to 1.5% by weight of the combined promoters, an overbased magnesium sulfonate product was formed, which had a high AV and TBN of from 400 to 500 or higher, with extremely low post carbonation sediment. The sediment observed in the reaction mixture after completion of the carbonation step is termed post carbonation sediment, (P.C.S.). The term P.C.S. as used hereinbefore and hereinafter refers not only to solids remaining after carbonation but to the solids remaining after any acidic material reaction. The % P.C.S. produced by the present reaction is generally less than 5.0% by volume of the reaction mixture.

Pursuant to the teaching of the present invention the first promoter is more oil soluble than the second promoter, particularly when the second promoter is a carboxylic acid. More generally speaking, the first promoter is characterized as being oil soluble, whereas the second promoter is characterized as being water soluble.

Naphthenic acids when present in the reaction mixture promote the incorporation of the acidic material. These acids are a well-known class of compounds derived from petroleum straight run distillates, generally kerosene and gas oil. Caustic soda scrubbing of these materials followed by acidification of the resulting sodium naphthenate solution yields the acids. Acidification is generally accomplished with sulfuric acid. The supernatant crude naphthenic acids are obtained by decantation and may be purified by distillation, if desired. In addition, naphtha washing of the sodium naphthenate solution can be performed to decrease the hydrocarbon oil content of the finished acids.

Naphthenic acids are a mixture of compounds. They include cycloalkyl carboxylic acids substituted with one or more predominantly hydrocarbyl substituents. The cycloalkyl groups usually contain five or six carbon atoms. Each cycloaliphatic ring is substituted with one or more carboxylic acid groups. The only restriction on the hydrocarbyl substituents on the cycloaliphatic ring is that they contain a sufficient number of carbon atoms to make the naphthenic acids oil soluble. This will generally range from about four to about 40 carbon atoms.

Naphthenic acids also include cycloalkyl substituted aliphatic acids. The cycloalkyl group and the aliphatic group are such that the total molecule is oil soluble. The carbon atom content of the cycloalkyl and aliphatic moieties will generally be about the same as for the hydrocarbyl substituted cycloalkyl carboxylic acids.

Naphthenic acids also include noncyclic aliphatic acids. In these, the aliphatic moiety contains sufficient carbon atoms to make the molecule oil soluble. In general, they will contain at least 11 carbon atoms and more, usually 15 carbon atoms up to about 40 carbon atoms.

Suitable oil soluble naphtenic acids pursuant to the present invention include, by way of example, the derivatives of cyclopentane, cyclohexane, cycloheptane and other well known naphthenic acids.

Suitable oil soluble carboxylic acids pursuant to the present invention include aliphatic carboxylic acids, for example, dimethylhexanoic, neodecanoic, valeric, capric, caproleic, lauric, myristoleic, palmitic, oleic, stearic, vaccenic, linoleic, linolenic, behenic, cerotic, montanic, melissic and chaulmoogric acid.

Suitable second promoter acids, include, by way of example, benzoic, salicylic, alkyl salicylic, tropric, phthalic, divaric, anthranilic and the like.

Suitable water soluble $C_1$–$C_6$ carboxylic acids include formic acid, acetic acid and the like.

Sulfonic acids suitably used in accordance with this invention are preferably oil-soluble sulfonic acids. Such sulfonic acids include preferentially oil-soluble petroleum sulfonic acids, commonly referred to as "mahogany acids," alkyl sulfonic acids, aryl sulfonic acids, and alkaryl sulfonic acids. Illustrative of suitable sulfonic acids are the preferentially oil-soluble petroleum sulfonic acids, e.g., "mahogany acids" of about 350 to 750 molecular weight, dilauryl aryl sulfonic acid, lauryl cetyl aryl sulfonic acid, paraffin wax-substituted benzene sulfonic acids, didodecyl benzene sulfonic acids, polyolefin alkylated benzene sulfonic acids, such as polybutylene alkylated benzene sulfonic acids, in which the polybutylene substituents have molecular weights of at least about 200, and preferably within the range of from about 300 to about 2500; polypropylene alkylated benzene sulfonic acids in which the polypropylene substituents have a molecular weight of at least about 250, and preferably within the range of from about 290 to about 1500; naphthalene sulfonic acids; alkyl-substituted naphthalene sulfonic acids; and the like.

The preparation of the sulfonic acid is well-known to those skilled in the art. Such sulfonic acids can be prepared by reacting the material to be sulfonated with a suitable sulfonating agent, such as concentrated sulfuric acid, fuming sulfuric acid, chlorosulfonic acid or sulfur trioxide, for a period of time sufficient to effect sulfonation, and thereafter separating insoluble acid sludge from the oil-soluble sulfonic acid.

The type of magnesium oxide used in a preferred embodiment of the process is the light or active form. The amount of magnesium oxide used is dependent upon the metal ratio desired in the final product. The metal ratio is the ratio of the number of equivalents of magnesium in the overbased compound to the equivalents of sulphonic acid in the overbased compound. Therefore, to obtain a metal ratio of, for example, 30, there must be at least thirty equivalents of magnesium oxide per equivalent of sulphonic acid in the initial reaction mixture. It is apparent that when the reaction is carried out under less favorable conditions at lower efficiencies, an excess of magnesium oxide beyond that determined by the metal ratio should be used to ensure sufficient incorporation of magnesium within the structure of the overbased magnesium salt of the sulfonic acid.

The alcohols used in this process include lower aliphatic alkanols, alkoxy alkanols, and mixtures thereof, where the number of carbon atoms usually does not exceed 5. Examples of the alcohols include methanol, ethanol, isopropanol, n-propanol, butanol, and pentanol. The preferred alcohol is methanol because of the low cost and ease of removal from the reaction mixture. An example of a suitable alkoxy alkanol includes methoxy ethanol.

Several different types of volatile and non-volatile diluents may be used in this process. The non-volatile diluents are generally mineral or synthetic lubricating oils, such as lubricating oils having a viscosity around 100 SUS at 100° F. The volatile diluents which are inert to the reaction are preferably hydrocarbons with boiling points ranging from 150° to 300° F. These can be aliphatic, aromatic, or a mixture of both types of solvents. For example, naphtha is a particularly useful diluent. Other types of suitable diluents include Stoddard solvent, cycloaliphatic and aromatic hydrocarbons, and corresponding halogenated hydrocarbons, such as chlorobenzene, and other conventional organic diluents generally employed in the overbasing procedures in this particular art of manufacture. The amount of diluent used is sufficient to lower the viscosity of the reaction mixture to facilitate mixing thereof during the introduction and contacting of the acidic gas with the mixture.

It is within the broad contemplation of this invention to employ any well known acidic material including by way of example, $B_2O_3$, $CO_2$, $H_2S$, $SO_2$, HCl, $NO_2$, $PCl_3$, $ClO_2$, $SOCl_2$, $BF_3$, $CS_2$, COS, formic acid, oxalic acid, acetic acid, and propionic acid. However, various types of acidic gases are preferrably used in overbasing magnesium sulfonates. The most preferred acidic gases are carbon dioxide, sulfur dioxide, nitrogen dioxide and hydrogen sulfide, with carbon dioxide being the most preferred acidic gas.

The length of time that the acidic gas is contacted with the reaction mixture depends upon the desired level of magnesium in the overbased magnesium sulphonate. The contacting of the gas with the mixture may be continued until no further gas is absorbed to indicate that substantially all of the magnesium oxide originally intoduced into the system has been reacted to form an overbased magnesium sulphonate. To determine when the absorption of the gas is complete, the flow rate of the acidic gas being introduced is compared to the flow rate of the gas leaving the system. When the flow rate of leaving gas almost equals the flow rate of the introduced gas, then the absorption is substantially complete.

As can be appreciated by those skilled in the art, impurities and other variations in the selected feed stocks and magnesium oxides, according to this invention, can cause the resultant product to have slightly different results than that achieved in the following examples. These examples are intended to illustrate various aspects of the invention and are not intended to limit the scope of the invention in any way.

EXAMPLE 1

Into a 1,000 ml. flask, fitted with mechanical stirrer, thermometer, condenser and coarse cylindrical dispersion tube, were charged:

268 grams of dilute sulfonic acid, comprising 47 grams (0.094 moles) of an essentially linear alkyl benzene sulfonic acid of approximately 500 molecular weight, 75 grams mineral oil diluent and 146 grams of VM and P naphtha. To this acid solution, 32 grams of light magnesium oxide was added, followed by the promoters consisting of 8.3 grams water, 8.3 grams methanol, 2.1 grams of a distilled naphthenic acid, (0.09 moles/mole sulfonic acid), and 0.4 grams of salicylic acid, (0.03 moles per mole sulfonic acid). This mixture was stirred vigorously and heated to 135° F., whereupon $CO_2$ was bubbled slowly into the reaction mass via a dispersion tube. Carbonation was continued for about two hours until the uptake of $CO_2$ was essentially completed. During that time, a further 8.3 grams of water was added after 15 minutes carbonation and an additional 8.3 grams water and 8.3 grams methanol were added after 40 minutes carbonation.

At the end of the reaction, some of the crude mass was centrifuged to determine the percent by volume unreacted solids. This is reported here as % post carbonation sediment (% PCS) and for the above reaction, 3.8% volume sediment was found. A portion of the crude reaction mass was filtered through a small laboratory pressure filter where the rate filtration was observed to be 83 grams per minute. The filtrate was heated to 400° F. to remove water, methanol and naphtha, leaving a clear and bright product with a TBN of 433.

EXAMPLE 2

This experiment illustrates the use of oleic acid, (0.09 moles/mole sulfonic acid), as a substitute for naphthenic acid, using the exact procedure as Example 1. The crude product had a % PCS of 4.2%, filtered at a rate of 41.7 grams/minute to produce a final product that was clear and bright with a TBN of 410 and a 27.5% magnesium sulfonate content.

EXAMPLE 3

The process of Example 1 was repeated except that 0.053 moles neodecanoic acid per mole sulfonic acid was used as a promoter in combination with 0.023 moles salicylic acid per mole sulfonic acid.

Immediately after carbonation the sediment level was observed to be 3.4%. The product filtered at a rate of 45.5 grams/minute and after filtration the sediment level was found to be 0.04%. The final product was a bright fluid having a TBN of 418 and a mangesium sulfonate content of 27.7%.

EXAMPLES 4-6

Table I summarized results of a series of experiments that are essentially a repeat of examples 1, 2 and 3 respectively, except that salicylic acid was omitted from the formulation. It is obvious from these results that in the absence of a second promoter, the overbasing reaction is much less efficient. The crude reaction mass contains approximately twice the level of sediment found in examples 1–3, and filters at a much slower rate.

TABLE I

| Example | Promoter (moles/moles sulfonic acid) | % PCS | TBN | Filtration Rate (gms/minute) |
| --- | --- | --- | --- | --- |
| 4 | Naphthenic Acid 0.09 | 7.6 | 390 | 10.2 |
| 5 | Oleic Acid 0.09 | 8.0 | 384 | 8.8 |
| 6 | Neodecanoic Acid 0.05 | 6.0 | 400 | 18.7 |

EXAMPLE 7

To a 1 liter reactor equipped with an agitator, overhead condenser, heating mantel, gas sparger and a temperature controller, was charged 0.094 moles of an Esso France sulfonic acid believed to be made from a branched benzene alkylate (mol. wt. 430) prepared by alkylating benzene with a dimerized dodecane, followed by 125 grms VM & P naphtha and 25 grams of a light magnesium oxide. 16⅔ gms. of a 50/50 weight solution of water/methanol was added next, followed lastly by 0.0123 moles of an undistilled naphthenic acid. The temperature was adjusted to 120° F. and carbon dioxide was introduced via a gas sparger. After 15 minutes into the carbonation, 8 grams of water was added and after 40 mins., 16⅔ grms. of a 50/50 mixture of water/methanol was charged. Finally, after 70 minutes carbonation an extra 8 grams of magnesium oxide was charged to the reaction mass. At the end of the carbonation period, 70 grams diluent oil was added and the crude mixture filtered. The filtration rate was observed to be 10 grams/minute. The final product had a TBN of 350. Prior to filtration the % PCS was equal to 15.0%.

EXAMPLE 8

The exact procedure of Example 7 was repeated except that instead of naphthenic acid, 0.01 moles of oleic acid was added as the sole promoter. A final product with a TBN of 321 resulted.

EXAMPLE 9

Once again the exact procedure of Example 7 was followed except that this time no oil soluble promoter was included and instead 0.022 moles of salicylic acid was charged. A product was not recovered as the reaction mass solidified part way through the carbonation step.

EXAMPLE 10

In this experiment 0.037 moles of glycine were added as the sole reaction promoter, and the procedure of Example 7 was followed. After $CO_2$ addition, the crude mass contained 16% sediment, filtered at a rate of 5.0 grams per minute and had a TBN of only 300.

EXAMPLES 11–14

The results from Examples 11–14 shown in Table II, when compared with Examples 7 through 10, clearly demonstrate the vast improvement in reaction efficiency and filterability that is observed when a combination of promoters is used.

TABLE II

| Example | Oil Soluble Promoter | Moles/Mole Sulfonic Acid | Oil Insoluble Promoter | Moles/Moles Sulfonic Acid | % PCS | Filter Rate (grams per minute) | TBN |
| --- | --- | --- | --- | --- | --- | --- | --- |
| 11 | Naphthenic Acid | 0.13 | Salicylic Acid | 0.032 | 6.0 | 18¾ | 390 |
| 12 | Oleic Acid | 0.11 | Salicylic Acid | 0.032 | 6.5 | 37.5 | 380 |
| 13 | Naphthenic Acid | 0.13 | Glycine | 0.05 | 8.0 | 13.6 | 385 |
| 14 | Oleic Acid | 0.11 | Glycine | 0.05 | 9.5 | 10.0 | 365 |

EXAMPLES 15–27

Table III summarizes a series of experiments which illustrates various useful co-promoters that when used in conjunction with an oil soluble naphthenic acid produce a low solids, fast filtering, overbased magnesium sulfonate. The procedure of Example 1 was followed and the sulfonic acid used was the same as that of Example 1.

TABLE III

| Example | Naphthenic Acid moles/mole RSO3H | Oil Insoluble Promoter | moles/mole RSO3H | % PCS | Filtration grms/min | TBN | Appearance |
| --- | --- | --- | --- | --- | --- | --- | --- |
| 15 | 0.09 | Salicylic Acid | 0.03 | 3.8 | 50 | 435 | bright & clear |
| 16 | 0.06 | " | 0.03 | 3.6 | 31.5 | 420 | " |
| 17 | 0.09 | Benzoic Acid | 0.03 | 3.2 | 38.5 | 426 | " |
| 18 | 0.06 | " | 0.03 | 3.2 | 33.8 | — | " |
| 19 | 0.09 | Anthanilic Acid | 0.03 | 6.0 | 24.0 | 416 | " |
| 20 | 0.06 | " | 0.03 | 3.6 | 34.0 | 419 | " |
| 21 | 0.09 | Acetyl Salicylic Acid | 0.03 | 5.0 | 25 | 420 | " |
| 22 | 0.09 | Phthalic Acid | 0.03 | 6.5 | 21½ | 418 | " |
| 23 | 0.09 | Formic Acid | 0.10 | — | 28 | 390 | " |
| 24 | 0.09 | Acetic Acid | 0.09 | — | 29 | 393 | slightly viscous |
| 25 | 0.09 | Propionic | 0.07 | 3.8 | 28 | 420 | bright & clear |
| 26 | 0.06 | " | 0.05 | 3.8 | 27 | 414 | " |
| 27 | 0.09 | None included | | 7.6 | 10.2 | 390 | " |

EXAMPLES 28–30

The procedure of Example 1 was followed to prepare the products of Examples 28–30. These results clearly show the apparent promoter synergism that is observed when a combination of promoters is used. In comparing Examples 28, 29 and 30, where the same total weight percent of promoter was present, it is clear that the reaction was much more efficient and thus more economical when both salicylic acid and naphthenic acid were included together during the reaction, as opposed to either one alone. It is also worthwhile to note that extremely small amount of total promoters, around 1.0% of the batch yield, are sufficient to achieve excellent results.

TABLE IV

| Example % | Naphthenic Acid % | Salicylic Acid % | PCS % | Filtration (grams/min) | TBN |
| --- | --- | --- | --- | --- | --- |
| 28 | 0.8 | 0.3 | 3.6 | 46.3 | 408 |
| 29 | 1.1 | Nil | 6.8 | 20 | 364 |
| 30 | Nil | 1.1 | Product not recovered due to high viscosity | | |

EXAMPLE 31

Into a stainless steel 8 gallon pilot plant reactor equipped with agitator, condenser, heating and cooling coils and gas dispersion bubble was charged the following ingredients: 2035 parts of an alkylated benzene sulfonic acid (4.07 moles), 6000 parts VM & P naphtha, 3240 parts mineral oil diluent and 1400 parts of a light magnesium oxide. This mixture was stirred vigorously, then 320 parts water and 216 parts methanol were added, followed by 12 parts salicylic acid (0.087 moles), and 90 parts of a distilled naphthenic acid (0.375 moles). The temperature of the mixture was adjusted to 140° F. and then the carbon dioxide was introduced at 8 std. cu. ft./hour. During the first 40 minutes, a further 640 parts of water and 216 parts of methanol was introduced. After about 3 hours, the $CO_2$ flow was reduced to 4 std. cu. ft./hr for one hour at which time part of the mixture was filtered and the filtrate stripped to 400° F. Immediately after carbonation, the crude product contained 2.0% sediment, and filtered at a rate of 42 grams/min. to produce a final product that was exceptionally clear and bright with a TBN of 421, a viscosity of 110 centistokes at 100° C. and a sediment level of 0.02%.

All parts stated above are parts by weight.

EXAMPLE 32

The procedure of Example 31 was repeated except that the amount of water added during the carbonation step was increased to 1325 parts, (2.3 mols/mol overbasing oxide). The crude product contained 2.1% sediment and filtered at 50 grams per minute to produce a final product with a TBN of 410.

EXAMPLE 33

The procedure of Example 31 was repeated again but this time only 702 parts of water was added, (1.2 mols/mol overbasing oxide). The filtered and stripped product was bright and clear with a 376 TBN.

EXAMPLE 34

While repeating the procedure of Example 31, the parts by weight of added methanol were increased to 1150, equivalent to 1.1 moles/mole overbasing oxide. The crude overbased product contained 3.4% sediment and filtered at 30 grms/min. to produce a bright and clear fluid with a TBN of 411.

EXAMPLE 35

A mixture comprising 2035 parts of a linear alkyl benezene sulfonic acid, (4.1 moles), 5000 parts VM & P naphtha, 3200 parts mineral oil diluent, 1050 parts MgO, 290 parts water, 350 parts methanol and 90 parts naphthenic acid (0.375 moles) was heated to 140° F. and carbonated at 11 s.c.f./hr. for a total of 2 hours. During the first 40 mins., an additional 580 parts water and 350 parts methanol were introduced into the reaction and after 70 mins. carbonation, a further 300 parts MgO was added. At the end of the carbonation period, and after filtration, a bright and clear product was recovered that had a TBN of 364 and viscosity of 83 centistokes (CS) at 100° C.

EXAMPLES 36–40

The procedure of Example 35 was followed to prepare the products of Examples 36–40, shown in Table 5, but in addition to naphthenic acid, salicylic acid was added in varying amounts as a second promoter. One can see that as little as 0.10% of salicylic acid (0.013 moles/mole of sulfonic acid) contributed to an increase of about 18 TBN units in the final product, while an increase of about 50 TBN is possible by including during overbasing 0.18% of yield of salicylic acid.

TABLE V

| No. | Naphthenic Acid (moles/mole Sulfonic Acid) | Salicylic Acid (moles/mole Sulfonic Acid) | % PCS | TBN | Viscosity (CS 100° C.) |
|---|---|---|---|---|---|
| 35 | 0.09 | Nil | 6.3 | 364 | 81 |
| 36 | 0.09 | 0.013 | 4.6 | 382 | 114 |
| 37 | 0.09 | 0.019 | 3.6 | 402 | 114 |
| 38 | 0.09 | 0.023 | 3.0 | 412 | 157 |
| 39 | 0.09 | 0.028 | 3.0 | 410 | 165 |
| 40 | 0.09 | 0.038 | 3.0 | 409 | 174 |

What is claimed is:

1. A process for the preparation of overbased magnesium sulfonates comprising; mixing a sulfonic acid or salt thereof, a magnesium oxide, water, alkanol, and a combination of first and second promoters, wherein the first promoter is one selected from an oil soluble naphthenic acid and an oil soluble carboxylic acid or salt thereof; and a second promoter being one selected from:

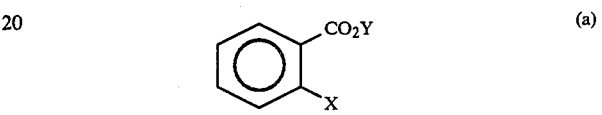

wherein X is one of H, OH, $NH_2$, $CO_2H$, $OCOCH_3$ and SH, and Y is one of H, $CH_3$, $CH_2CH_3$, wherein the second promoter is less oil soluble than the first promoter; and (b) a water soluble $C_1$–$C_6$ carboxylic acid; heating the reactants; and passing an acidic material through the reactants to form the overbased magnesium sulfonate product.

2. The process of claim 1, wherein the total amount of first and second promoters is about 1.0 to 1.5% by weight.

3. The process of claim 1, wherein the acidic material is carbon dioxide.

4. The process of claim 1, wherein the PCS is less than 5% by volume.

5. The process of claim 1, wherein sulfonate product contains less than about 0.1% sediment.

6. The process of claim 1, wherein passing of the acidic material is conducted between 100° to 155° F.

7. The process of claim 1, wherein the TBN of the product is in excess of 400.

8. The process of claim 1, wherein the weight of the first promoter is 0.5% to 1.5% and the weight of the second promoter is 0.1% to 0.5%.

9. The process of claim 8, wherein the PCS is less than 5% by volume.

10. The process of claim 1, wherein the second promoter is salicylic acid.

11. The process of claim 10, wherein the first promoter is naphthenic acid.

12. The process of claim 1, wherein the second promoter is benzoic acid.

13. The process of claim 12, wherein the first promoter is naphthenic acid.

14. The process of claim 1, wherein the first promoter is neodecanoic acid and the second promoter is salicylic acid.

15. The process of claim 1, wherein the first promoter is neodecanoic acid and the second promoter is benzoic acid.

16. The process of claim 1, wherein the first promoter is oleic acid.

17. The process of claim 16, wherein the second promoter is salicylic acid.

18. The product produced by the process of claim 1.

* * * * *